March 28, 1967 E. H. MOTTUS 3,311,559
OIL ADDITIVE
Original Filed Aug. 31, 1962 2 Sheets—Sheet 1

FIG. 1

INVENTOR
EDWARD H. MOTTUS
BY
Robert J. Schaap
ATTORNEY

FIG. 2

United States Patent Office 3,311,559
Patented Mar. 28, 1967

3,311,559
OIL ADDITIVE
Edward H. Mottus, Ballwin, Mo., assignor to Monsanto Company, a corporation of Delaware
Original application Aug. 31, 1962, Ser. No. 224,883. Divided and this application May 12, 1966, Ser. No. 549,629
8 Claims. (Cl. 252—51.5)

This application is a division of my application Ser. No. 224,883, filed Aug. 31, 1962.

The invention relates to new polymers providing excellent low and high temperature properties and good dispersant properties in oil compositions. The invention further relates to methods of making these polymers and to oil compositions of the polymers. The mineral oil compositions of the invention are especially useful in internal combustion engines. The new polymers will also have pour point depressant properties in some cases, depending on the mixture of monomers polymerized. The invention also relates to functional fluids including mineral and synthetic oils, lubricating oil, diesel oil, hydraulic oil, automatic transmission oil and furnace oil compositions and the like containing the polymeric additives of the invention.

Oil additives are customarily evaluated for viscosity effect at temperatures of 100° F. and 210° F. However, when used at higher temperatures than 210° F., such as 300°–400° F., the additive may or may not be suitable. In an internal combustion engine the lubricant encounters temperatures of the order of 300°–400° F. or higher in some parts of the engine. It is desirable that a lubricant additive improve the oil by lowering the viscosity of the oil at low temperatures and increasing the viscosity of the oil at high temperatures. Such an additive at low temperatures gives faster starting and lower battery power consumption and at high temperatures less wear and less oil consumption. Some new additives have now been found which have low and high temperature properties superior to some of the best commercial oil additives and in addition these additives have good detergency properties.

It is an object of this invention to provide new polymers, especially useful as oil additives providing oil compositions having excellent low and high temperature properties and good detergency properties.

It is another object of this invention to provide new polymers useful as oil additives providing oil compositions having low pour point as well as excellent low and high temperature properties and good detergency properties.

It is another object of this invention to provide new oil compositions having excellent high and low temperature properties and detergency properties.

It is another object of the invention to provide a method of making the polymers of the invention.

These and other objects of the invention will become apparent as the detailed description of the invention proceeds.

The new polymers of the invention are oil-soluble polymers of an ester of an unsaturated carboxylic acid and tetrahydrofurfuryl alcohol. The oil solubility can be provided in one or more ways, depending on the particular tetrahydrofurfuryl ester used, such as: (a) the carboxylic acid may have an alkyl group of from 6 to 30 carbon atoms which will provide the oil solubility, (b) the tetrahydrofurfuryl alcohol may have attached to the ring an alkyl group having from 6 to 30 carbon atoms which will provide the oil solubility, or (c) the oil solubility can be provided by polymerizing with the tetrahydrofurfuryl ester a comonomer to provide oil solubility.

Tetrahydrofurfuryl ester monomers useful in making the polymers of the invention are of the formula wherein R is an olefinically unsaturated organic radical, preferably a hydrocarbon radical with or without an additional carboxy or alkyl carboxylate radical attached, $R^1$, $R^2$ and $R^3$ are hydrogen or alkyl radicals of from 1 to 30 carbon atoms. These tetrahydrofurfuryl esters are made by esterifying a carboxylic or dicarboxylic acid with a tetrahydrofurfuryl alcohol or by ester interchange using a tetrahydrofurfuryl alcohol and an ester of a carboxylic, preferably a monocarboxylic or a dicarboxylic acid. An illustrative but non-limiting list of carboxylic acids suitable for esterifying with a tetrahydrofurfuryl alcohol are the following: methacrylic acid, acrylic acid, fumaric acid, maleic acid, crotonic acid, oleic acid, etc. Preferred tetrahydrofurfuryl esters are tetrahydrofurfuryl methacrylates, such as tetrahydrofurfuryl methacrylate and 5-methyl tetrahydrofurfuryl methacrylate.

The preferred polymer additives of the invention are the tetrahydrofurfuryl methacrylate and alkyl methacrylate polymers containing a minor amount of tetrahydrofurfuryl methacrylate and a major amount of alkyl methacrylates. A major amount means in excess of 50 percent by weight and a minor amount means less than 50 percent by weight, and obviously when two minor amounts are specified along with a major amount the two minor amounts must add up to less than 50% by weight.

If the alcohol used to form the alkyl methacrylate monomers from methacrylic acid is a mixture of straight-chain alcohols, such as the "Lorol" alcohols, then the polymers are also good pour point depressants. As dispersant additives these tetrahydrofurfuryl methacrylate/alkyl methacrylate polymers of the invention are useful as additives to oils, such as automatic transmission oils, lubricating oils, diesel oils, furnace oils, hydraulic oils and the like. The oils can either be mineral or synthetic oils. Normally these polymers as dispersant additives will be incorporated in oil in amounts of from about 0.5 to about 15% based on the oil and the polymer, preferably from about 1 to about 10%; except that if made up in concentrate form for blending back, they may be incorporated in amounts of about 15 to 60%, preferably about 20 to about 50%. These additives must be oil soluble, preferably to the extent of at least about 1% in oil. The solubility will, of course, vary depending on the particular oil used. Oil solubility can be regulated to a certain extent by limiting the molecular weight of the polymer, specific viscosity measurements being indicative of molecular weight. Specific viscosity, 1% in benzene at 25° C., should be between 0.4 and 7.0, preferably between 0.6 and 3.0. Solubility in oil can also be regulated by the number of carbon atoms in the alkyl groups of the methacrylates, which should be at least 6 carbon atoms, and preferably average at least 7.5 where the oil is a mineral lubricating oil. Single alkyl methacrylates can be used in making the polymers such as those having from about $C_6$ to about $C_{20}$ alkyl groups or mixtures of methacrylate monomers such as $C_8$–$C_{20}$ plus $C_1$–$C_4$ alkyl methacrylates. If a mixture of short- and long-chain alkyl methacrylate monomers is used with the tetrahydrofurfuryl methacrylate to form polymers of the invention, the long-chain alkyl methacrylates are preferably present in weight percent excess over the short-chain alkyl methacrylates, but in any event the amount of short-chain alkyl methacrylate is restricted to insure oil solubility of the polymer. For the purposes of the invention, oil-solubility is defined as the polymer being soluble at 25° C. to the extent of at least 1% in a petroleum base hydraulic fluid meeting government specifications MIL–O–5606.

The following is a non-limiting and illustrative list of alkyl methacrylate monomers from which can be chosen single monomers or combinations of monomers for use in making the polymers of the invention: methyl methacrylate, ethyl methacrylate, n-propyl methacrylate, isopropyl methacrylate, n-butyl methacrylate, isobutyl methacrylate, t-butyl methacrylate, n-amyl methacrylate, n-hexyl methacrylate, n-heptyl methacrylate, n-octyl methacrylate, isooctyl methacrylate, n-decyl methacrylate, n-dodecyl methacrylate, t-dodecyl methacrylate, oxo-tridecyl methacrylate, "Lorol" methacrylate, tallow methacrylate, n-eicosyl methacrylate, etc. Tallow methacrylate is a mixture of about 33% by weight of $C_{16}$ and 67% by weight of $C_{18}$ straight-chain alkyl methacrylates.

The tetrahydrofurfuryl esters of the unsaturated carboxylic acids can be copolymerized with a large number of other comonomers and if the tetrahydrofurfuryl ester does not provide the oil solubility characteristics then comonomers giving oil-solubility must be copolymerized with it. The following is an illustrative list of comonomers copolymerizable with the tetrahydrofurfuryl esters:

Olefins:
    Ethylene
    Propylene
    Butene-1
    Isobutene
    Pentene-1
    Hexene-1
    2-ethylhexene-1
    Di- and triisobutylene
    Tripropylene
    Dodecene-1
    Hexadecene-1
    Cyclohexene
    Octadecene-1
    4-octylcyclohexene-1
    3-phenylhexadecene-1
    p-Octylstyrene
    Vinylcyclohexane
    2-hexadecylbutadiene-1,3
    p-Tertiarybutylstyrene Ethers:
    Vinyl n-butyl ether
    Vinyl 2-ethylhexyl ether
    Allyl n-butyl ether
    Allyl isobutyl ether
    Allyl cyclohexyl ether
    Allyl 4,4,8,8-tetramethyl-docosyl ether
    Methallyl n-hexyl ether
    Methallyl n-decyl ether
    Methallyl 2-ethylhexyl ether
    Methallyl octadecyl ether
    Propenyl 2-ethylhexyl ether
    Crotyl n-octyl ether
    Isopropenyl dodecyl ether
    1-decenyl butyl ether
    1-eicosenyl decyl ether
    Vinyl p-octylphenyl ether
    Methallyl p-tert. butylphenyl ether
    1-decenyl p-cetylphenyl ether
    1-decenyl 2-phenylbutyl ether Esters:
    Vinyl caproate
    Vinyl palmitate
    Vinyl oleate
    Allyl caprylate
    Allyl laurate
    Allyl oleate
    Allyl palmitate
    Allyl stearate
    Allyl-2-ethylhexanoate
    Allyl ricinoleate
    Allyl esters of babassu acids
    Allyl esters of lard acids
    Allyl naphthenate
    Methallyl caproate
    Methallyl naphthenate
    Methallyl ricinoleate
    Methallyl p-octylbenzoate
    Methallyl oleate
    Methallyl cyclohexane carboxylate
    Methallyl palmitate
    Crotyl oleate
    Crotyl naphthenate
    α-Methylcrotyl palmitate
    1-propenyl naphthenate
    1-propenyl elaidate
    Dodecyl acrylate
    Isobutyl α-decylacrylate
    Vinyl p-n-octyl benzoate
    Allyl 3,5-diisobutyl benzoate
    Cyclohexyl methacrylate
    Cyclohexyl 2-dodecenoate
    Decyl vinylacetate
    Isooctyl α-chloroacrylate
    p-Isoamylphenyl 2-hexadecenoate
    4-p-tolylbutyl 2-octadecenoate
    Undecyl cinnamate
    Methylcyclohexyl 2-ethyl-2-hexenoate
    5-ethyldocosyl crotonate
    Octadecyl isocrotonate
    n-Butyl 2-eicosenoate
    p-Tert. amylphenyl octadecyl maleate
    p-Hexadecylphenyl 2-ethylhexyl maleate
    o-Tolyl 2-octadecylcyclohexyl maleate
    O-nonylphenyl-hexadecyl maleate
    Dihexadecyl maleate
    Di-methylcyclohexyl maleate
    Mono-2-ethylhexyl maleate
    Di-2-ethylhexyl maleate
    Di-dodecyl maleate
    Di-dodecyl fumarate
    Di-dodecyl mesaconate
    Di-dodecyl citraconate
    α-Tolyl octadecyl itaconate
    Mono-hexadecyl itaconate
    Isopropenyl palmitoleate
    1-decenyl laurate
    1-hexadecenyl myristate As has already been stated, good dispersant polymers can also be made by polymerizing tetrahydrofurfuryl methacrylate with other monomers such as acrylates, fumarates, maleates, vinyl esters, alpha olefins, etc. Also, mixtures of these other monomers, including methacrylates, can be used if desired. These other monomers should be chosen to provide an oil-soluble polymer. For example, alpha-olefins or mixtures thereof having an average of at least 8 carbon atoms, preferably 10 or higher should be used, with an upper limit of about 20 being preferred. Thus, bearing in mind the above limitations, an olefin or a combination of olefins can be picked from the following illustrative list: ethylene, propylene, isobutene, pentene-1, 2-methyl butene-1, 3-methyl butene-1, hexene-1, heptene-1, octene-1, decene-1, dodecene-1, tridecene-1, heptadecene-1, octadecene-1, eicosene-1, etc. Obviously, the short-chain olefins must be used in mixtures with long-chain olefins to give oil-soluble polymers. In the case of the acrylates, nothing would be accomplished by naming a large number of them since the alkyl acrylates corresponding to the named alkyl methacrylates will be usable, and the same limitations apply as for the methacrylates.

For the fumarates and maleates the average number of carbon atoms in the two alkyl groups must be sufficient to give oil solubility, i.e., at least 6 and preferably 8 to about 20. Thus, to meet these requirements single or mixtures of fumarates and maleates can be selected from the following illustrative list: dimethyl fumarate, dimethyl maleate, diethyl fumarate, ethylmethyl fumarate, diisopropyl maleate, di-t-butyl fumarate, di-n-butyl fumarate, diisobutyl fumarate, ethyl-n-butyl maleate, di-n-hexyl fumarate, di-n-decyl maleate, methyl lauryl fumarate, tetrahydrofurfuryl "Lorol" maleate, etc. It should be noted that the last-named monomer contains a tetrahydrofurfuryl radical in addition to a long-chain alkyl and in this case the homopolymer of this monomer would be a good lubricant additive of the invention.

In the case of the vinyl esters the solubility must, of course, be supplied by the acid radical portion of the molecule and this portion of the molecule should average at least six and preferably 8 to 20 carbon atoms per molecule. Thus vinyl esters or mixtures can be selected from the following illustrative list: vinyl acetate, vinyl propionate, vinyl n-butyrate, vinyl isobutyrate, vinyl n-valerate, vinyl trimethylacetate, vinyl caproate, vinyl n-heptylate, vinyl caprylate, vinyl 2-ethyl hexoate, vinyl pelargonate, vinyl palmitate, vinyl stearate, etc.

Tetrahydrofurfuryl methacrylate can be used alone or along with other monomers in methacrylate type polymers as has been stated above. The tetrahydrofurfuryl methacrylate will enhance or complement the dispersant activity or low and high temperature properties of such monomers as N-vinyl-2-pyrrolidone, vinyl pyridine, vinyl acetate, vinyloxyethanol, methacrylamides, hydroxyalkyl methacrylates and acrylates, e.g. hydroxyethyl methacrylate, aminoalkyl methacrylates and acrylates, e.g. dimethylaminoethyl methacrylate, t-butylaminoethyl methacrylate, etc., polyalkyleneoxy methacrylates and acrylates, polyaminoalkylene acrylates and methacrylates, hydroxy- and amino-alkyl derivatives of fumaric and maleic acids, etc.

Illustrative of other miscellaneous monomers which can be copolymerized with a tetrahydrofurfuryl ester are the following: methacrylic acid, acrylic acid, fumaric acid, maleic acid, maleic anhydride, etc.

Other oil soluble polymers used as VI improvers such as vinyl acetate/fumarate, isobutylene/fumarate, ethylene/maleate, polyisobutylene, styrene/maleate, styrene/fumarate, polyvinylethers and their copolymers, polyacrylates, polypropylenefumarates or maleates, acrylate/methacrylate copolymers, etc., can be converted to VI improvers—dispersant types by adding minor amounts of tetrahydrofurfuryl methacrylate alone or along with other monomers that give dispersency, as a comonomer during polymerization period.

Depending on the particular use, it can be desirable for a functional fluid to have good low and high temperature properties. An illustrative but non-limiting list of functional fluids which are improved in low and high temperature properties and in dispersant characteristics by addition of polymers of the invention are the following: polyphenyls such as biphenyl, the terphenyls such as o-, m- and p-terphenyl and the alkylated biphenyls and terphenyls such as the mono or dialkyl, methyl, ethyl, n-propyl, isopropyl, n-butyl, isobutyl, t-butyl, etc.; partially chlorinated biphenyls such as those sold under the trademark "Aroclor," which contain from about 40 to 80% by weight of combined chlorine; poly(oxyphenylene) benzenes and particularly ethers of the formula wherein $n$ is an integer from about 3 to about 8, R is an alkyl radical having below about 5 carbon atoms, i.e. methyl, ethyl, n-propyl, isopropyl, n-butyl, isobutyl, t-butyl or mixtures thereof, and $x$ is an integer from 0 to 4; diesters of dicarboxylic acids such as dioctyl sebacate and dioctyl adipate and esters such as pentaerythritol tetracaproate; phosphates such as trialkyl phosphates from tributyl or trilauryl such as tri(2-ethylhexyl) phosphate, dialkyl monoaryl phosphates wherein the alkyl groups are $C_4$–$C_{12}$ and the aryl groups are phenyl or cresyl, particularly dibutyl phenyl phosphate and di(2-ethylhexyl) phenyl phosphate, the monoalkyl diaryl phosphates wherein the alkyl groups are $C_4$–$C_{12}$ and the aryl groups are phenyl and/or cresyl, especially 2-ethylhexyl diphenyl phosphate and 6-methylheptyl diphenyl phosphate, the liquid triaryl phosphates, namely tricresyl phosphate, cresyl diphenyl phosphate and phenyl dicresyl phosphate; liquid polymeric silicones which are well known in the art; etc.

In oil compositions of the invention, especially mineral oil compositions, other additives than the tetrahydrofurfuryl ester of the unsaturated carboxylic acid can be added and can be especially desirable, such as: heavy duty calcium- and barium-containing detergents, viscosity stabilizers, oxidation inhibitors, etc. Oxidation inhibitors are especially valuable in mineral oil compositions where the oil is highly purified because in the process of purification the natural oxidation inhibitors are removed from the oil.

The polymer additives of the invention can be made using free-radical generating catalysts such as peroxides, hydroperoxides, azo catalysts, etc., including irradiation with ultraviolet rays, X-rays, γ-rays, neutrons and the like. A new process usable to make polymers of the invention is described in copending application S.N. 79,672, filed Dec. 30, 1960 now abandoned. Temperatures of reaction will be the same as those customarily used for polymerizing with the particular catalyst used and pressure or vacuum operation can be used as desirable, depending on the temperature of polymerization and solvent used in polymerization. It will be desirable in most cases to use a solvent during polymerizatiton, such as benzene, toluene, xylenes and the like to maintain fluidity of the polymerizing mass and to facilitate completion of the polymerization. If the polymer is to be dissolved in oil, the oil can be added to the reaction mixture before the removal of the benzene. Rather than using benzene or similar volatile solvents, an oil such as a mineral oil can be used as the solvent during polymerization. If benzene or the like is used as a solvent for polymerization, the polymer product can easily be recovered and purified either by distillation under reduced pressure or by using a counter-solvent such as methanol to precipitate the polymer from the benzene. Reprecipitation from benzene using methanol can be used to further purify the polymer.

The invention will be more clearly understood from the following detailed description of specific examples thereof.

EXAMPLE 1

The apparatus used for making the run was a four-necked glass flask fitted with a condenser, a stirrer, a thermometer and a Y-fitting to take two dropping funnels. In the stirrer motor circuit are ammeters to determine the power requirements. Ammeter readings are observed to follow the increase in viscosity in the polymerization mixture. The apparatus is flushed with nitrogen both before and during polymerization. The mixture of methacrylate monomers to be polymerized is added to a 250 ml. dropping funnel (the catalyst being dissolved in the methacrylate mixture). Benzene is added to a second dropping funnel. The mixture of methacrylates charged to the dropping funnel is as follows:

|  | G. |
|---|---|
| Tridecyl methacrylate (0.365 mol) | 97.8 |
| Tallow methacrylate (0.210 mol) | 69.1 |
| Butyl methacrylate (0.250 mol) | 35.5 |
| Tetrahydrofurfuryl methacrylate (0.175 mol) | 29.8 |

Dissolved in the above mixture of methacrylate monomers was the catalyst 0.35 g. of benzoyl peroxide. About 80 ml. of the monomer mixture was added to the flask and heating was begun. Polymerization time was about 5 hours at a temperature of 90°–100° C. Periodically during the polymerization small amounts of the order of 15 ml. of the monomer mixture was added to the flask and 10 ml. portions of benzene from the other dropping funnel to keep the viscosity of the polymerization mixture from being too high. After about 2½ hours an additional 0.35 g. of benzoyl peroxide in 50 ml. of benzene was added to the reaction flask. Total benzene added during the run was 175 ml. At the end of the 5 hour polymerization period 226.5 g. of base oil No. 1 was added to the polymerization mixture and the mixture was allowed to stand overnight without heating. The next morning the mixture was stripped of benzene under vacuum up to a finished temperature of 165° C. at 3 mm. Weight of polymer recovered was 220.1 g. plus 226.5 g. of base oil. To this oil and polymer mixture was added 148.3 g. of the base oil to give a 37% concentrate of polymer in the base oil. A sample of this 37% concentrate was diluted with base oil No. 2 to 3% polymer concentration and viscosity determinations were made of the 3% polymer in oil. Specific viscosity at 100° F. was 0.634 and at 210° F. was 0.813. Efficiency was 1.282. Efficiency is a measure of the viscosity-temperature coefficient of a polymer in the solvent in which the measurements are made.

$$\text{Efficiency} = \frac{\text{Specific Viscosity at 210°F.}}{\text{Specific Viscosity at 100°F.}}$$

In general the higher the efficiency the higher is the viscosity index.

Two different mineral base oils were used in making up and testing the additive composition of Example 1, and these base oils were as follows:

*Base oil No. 1*

This oil is a highly paraffinic refined petroleum lubricating oil having the following properties:

| | |
|---|---|
| Viscosity at 100° F., SUS | 157 |
| Viscosity at 210° F., SUS | 44 |
| Flash point, ° F. | 405 |
| Specific gravity at 60° F. | 0.8665 |

*Base oil No. 2*

This oil is a solvent refined Mid-Continent petroleum lubricating oil having the following properties:

| | |
|---|---|
| Viscosity at 210° F., centistokes | 10.39 |
| Viscosity at 100° F., centistokes | 91.73 |
| Viscosity index | 103.4 |
| Flash point, Cleveland open cup, ° F. | 450 |

The additive product of the invention of Example 1 was tested in a carbon black dispersion test. This method tests the ability of the additive to hold carbon black dispersed in kerosene. A carbon black concentrate is made up to 15% by weight carbon in a highly refined mineral white oil. One gram of this carbon oil paste is added to a 25 x 150 mm. culture test tube with plastic closed top. To the test tube is added 30 g. of kerosene. Thus the concentration of carbon based on the kerosene is 0.5% by weight. Then 0.5% by weight based on the active ingredients present of the product of Example 1 is weighed into the test tube containing the kerosene and carbon black. The test tube is sealed and the ingredients dispersed by 15 minutes of vigorous shaking by hand. The test tube, after being thoroughly agitated, is placed in a rack and observations of the degree of settling are made periodically. The test was conducted at room temperature. Without a dispersant, i.e. a blank determination, the carbon black is completely settled in 15 minutes. The product of Example 1 showed dispersant properties in extending settling time to a number of hours.

EXAMPLE 2

This experiment was carried out in a similar manner to Example 1 using the same type of equipment. The mixture of monomers charged in this example was as follows: 86.3 g. tridecyl methacrylate (0.322 mol), 60.9 g. tallow methacrylate (0.185 mol), 11.3 g. methyl methacrylate (0.113 mol), 22.3 g. tetrahydrofurfuryl methacrylate (0.131 mol). The total charge of mixed monomers was about 205 ml. and contained 0.27 g. of benzoyl peroxide dissolved in the monomer mixture. Benzene was used again as a solvent for the reaction and heating time and heating temperature was substantially the same as in Example 1. The mixed monomers were added from a dropping funnel in a similar manner to Example 1. At the end of about 2 hours of polymerization 0.27 g. of benzoyl peroxide was added in 40 ml. of benzene. At the end of the 5 hour polymerization time 190.9 g. of base oil No. 1 was added to the reaction mixture The reaction mixture was allowed to cool overnight under nitrogen blanketing and the next morning the benzene was stripped out under vacuum to a finished temperature of 165° C./3 mm. In the polymer oil mix was 175.7 g. of polymer and 190.9 g. of base oil. To this polymer oil mixture was added an additional 108.3 g. of the base oil to give a 37% concentrate of polymer in base oil. A sample of the 37% concentrate was diluted to 3% polymer in base oil No. 2. Specific viscosity at 100° F. was 0.822 and at 210° F. was 1.098. Efficiency was 1.336. In a carbon black dispersion test the product of this example proved to be an effective dispersant.

EXAMPLE 3

This example was run in similar equipment and in a similar manner to Example 1, except as described below. In this example, in addition to the methacrylate monomers N-vinyl-2-pyrrolidone was one of the monomers and this monomer in an amount of 7.9 g. (0.071 mol) was charged to the reaction flask at the beginning of the polymerization. The following mixture of methacrylates was charged in the usual manner from a dropping funnel; 109.5 g. of tridecyl methacrylate (0.409 mol), 27.0 g. tallow methacrylate (0.234 mol), 14.3 g. methyl methacrylate (0.143 mol), 16.2 g. tetrahydrofurfuryl methacrylate (0.095 mol). The mixture in the dropping funnel constituted about 247 ml. and dissolved in this mixture of methacrylate monomers was 0.34 g. of benzoyl peroxide. Reaction conditions and reaction time was substantially the same as in Example 1. At the end of 2½ hours of polymerization 0.34 g. of benzoyl peroxide in 60 ml. of benzene were added to the reaction mixture. At the end of the polymerization run 247.0 g. of base oil No. 1 was added to the reaction mixture. The next morning the benzene was stripped out to a temperature of 135–140° C./20 mm. of Hg. Recovered polymer was 224.6 g. plus 247.0 g. of the base oil. To this polymer oil mixture was added 135.4 g. of the base oil to give a 37% concentrate. A sample of the 37% concentrate was diluted to 3% using base oil No. 2. Specific viscosities of the 3% polymer solution in oil were 0.810 at 100° F. and 1.073 at 210° F. Efficiency was 1.325. In a carbon black dispersion test the product of this example proved to be a very good dispersant.

EXAMPLE 4

This experiment was an experiment carried out in a similar manner to Example 3. To the reaction flask was charged 8.3 g. of N-vinyl-2-pyrrolidone. In the dropping funnel was 115.0 g. of tridecyl methacrylate, 80.9 g. of tallow methacrylate, 15.0 g. of methyl methacrylate, 17.0 g. of tetrahydrofurfuryl methacrylate. This mixture of methacrylate monomers in the dropping funnel constituted about 260 ml. containing 0.35 g. of benzoyl peroxide. Reaction time and reaction temperature were substantially the same as Example 1. At the end of about 2½ hours an additional 0.35 g. of benzoyl peroxide and 110 ml. of benzene was added to the reaction mixture. At the end of the polymerization run 266.9 g. of base oil No. 1 was added to the reaction mixture. The next morning the benzene was stripped out under reduced pressure to a finished temperature of 135–145° C./18 mm. of Hg. The polymer oil product contained 231.4 g. of polymer and 266.9 g. of the base oil. To this polymer oil product was added 127.1 g. of the base oil to make a 37% concentrate. A sample of the 37% concentrate was diluted to 3% polymer using base oil No. 2. Specific viscosity determinations on this 3% polymer sample were 0.651 at 100° F. and 0.841 at 210° F. Efficiency was 1.292. In a carbon black dispersion test the product of this example proved to be a very good dispersant.

EXAMPLE 5

This example was run in a similar manner to Example 1 with the exceptions described below. To a dropping funnel was charged 57.5 g. of tridecyl methacrylate, 40.5 g. of tallow methacrylate, 7.5 g. of methyl methacrylate, 14.5 g. of tetrahydrofurfuryl methacrylate and 0.5 g. of t-butylaminoethyl methacrylate. This monomer mixture totaled about 135 ml. In the monomer mixture was also dissolved 0.12 ml. of cumene hydroperoxide catalyst. To the reaction flask at the beginning of the run was added 6 ml. of "Hyamin" solution containing 0.06 g. of "Hyamin." "Hyamin" is a quaternary ammonium salt used as an activator for cumene hydroperoxide catalyst. Rather than 5 hours run time in this instance was 6 hours and 15 minutes and reaction temperature was about 120° C. in view of the cumene hydroperoxide catalyst. After about 4 hours of the run, 0.1 ml. of t-butyl hydroperoxide catalyst was added to the reaction mixture and an additional 4 ml. of "Hyamin" solution. Instead of benzene as a solvent for the reaction, toluene was used in this instance. At the end of the polymerization period 16.3 g. of sample was solvent-purified by precipitation from methanol to yield 10.6 g. (93% yield) of dry polymer. To the remainder of the reaction mixture was added 126.6 g. of base oil No. 1. The oil solution was stripped to remove the toluene under vacuum up to a temperature of 140° C. The oil polymer product contained 106.3 g. of polymer and 126.6 g. of the base oil. To this oil-polymer mixture was added 54.4 g. of the base oil to give a 37% concentrate. A sample of this 37% concentrate was diluted to 3% using base oil No. 2. Specific viscosity determinations were made on the 3% polymer solution giving 0.520 at 100° F. and 0.633 at 210° F. Efficiency was 1.275.

EXAMPLE 6

This experiment was carried out in a similar manner to Example 1. The monomers charged to the dropping funnel were 57.5 g. tridecyl methacrylate, 40.5 g. tallow methacrylate, 7.5 g. methyl methacrylate, 13.6 g. tetrahydrofurfuryl methacrylate, 1.0 g. hydroxyethyl methacrylate. Dissolved in the monomer mixture was 0.15 g. of benzoyl peroxide. Total monomer mixture was about 135 ml. Reaction time and reaction temperature were substantially the same as in Example 1. At about the middle of the reaction time an additional 0.15 g. of benzoyl peroxide was added to the reaction mixture. At the end of the polymerization period 158.0 g. of base oil No. 1 was added to the reaction mixture. The next day the benzene solvent was stripped under reduced pressure to a temperature of 140° C./15 mm. of Hg. The stripped product contained 118.3 g. of polymer and 158.0 g. of base oil. To this solution was added 43.4 g. of the base oil to make a 37% concentrate. A sample of this 37% concentrate was diluted to 3% in base oil No. 2. Specific viscosity measurements were made on the 3% polymer solution in oil giving 1.009 to 100° F. and 1.405 at 210° F. Efficiency was 1.392.

TABLE 1

| Ex. No. | Monomers | Monomers, Mole Ratio | Specific Viscosity | | | Process Details | | | |
|---|---|---|---|---|---|---|---|---|---|
| | | | At 100° F. | At 210° F. | Efficiency | Time, Hrs. | Temp., ° C. | Solvent | Catalyst |
| 1 | TrM/TaM/BM/THFM | 36.5/21/25/17.5 | 0.634 | 0.813 | 1.282 | 5 | 95 | Benzene | Bz₂O₂ |
| 2 | TrM/TaM/MM/THFM | 42.9/24.6/15.0/17.5 | 0.822 | 1.098 | 1.336 | 5 | 95 | do | Bz₂O₂ |
| 3 | TrM/TaM/MM/V₂P/THFM | 42.9/24.6/15.0/7.5/10.0 | 0.810 | 1.075 | 1.246 | 5 | 85 | do | Azo |
| 4 | TrM/TaM/MM/V₂P/THFM | 42.9/24.6/15.0/7.5/10.0 | 0.651 | 0.841 | 1.292 | 5¼ | 95 | do | Bz₂O₂ |
| 5 | TrM/TaM/MM/THFM/t-BAEM | 42.9/24.6/15.0/17.0/0.5 | 0.520 | 0.633 | 1.275 | 6¼ | 120 | Toluene | (1) |
| 6 | TrM/TaM/MM/THFM/HEM | 42.9/24.6/15.0/16.0/1.5 | 1.090 | 1.405 | 1.392 | 5 | 95 | Benzene | Bz₂O₂ |
| 7 | TrM/TaM/MM/THFM/t-BAEM | 42.9/24.6/15.0/17.0/0.5 | 0.609 | 0.846 | 1.389 | 6⅔ | 120 | Base Oil #1 | (2) |
| 8 | TrM/TaM/BM/V₂P | 36.5/21.0/25.0/17.5 | 0.869 | 1.138 | 1.310 | 4 | 95 | Benzene | Bz₂O₂ |
| 9 | TrM/TaM/BM/THFM | 36.5/21.0/17.5/25.0 | 0.621 | 0.942 | 1.517 | 5 | 95 | do | Bz₂O₂ |
| 10 | TrM/TaM/THFM | 47.6/27.4/25.0 | 1.036 | 1.316 | 1.270 | 5 | 95 | do | Bz₂O₂ |
| 11 | TrM/TaM/THFM/t-BAEM | 47.6/27.4/22.0/3.0 | 0.593 | 0.726 | 1.224 | 5¼ | 85 | do | Azo |
| 12 | TrM/TaM/MM/THFM/t-BAEM | 42.9/24.6/15.0/17.0/0.5 | 0.526 | 0.641 | 1.219 | 5¼ | 85 | do | Azo |
| 13 | TrM/TaM/MM/THFM/HEM | 42.9/24.6/15.0/16.5/1.0 | 0.672 | 0.887 | 1.320 | 5¼ | 85 | do | Azo |
| 14 | TrM/TaM/MM/THFM/t-BAEM | 42.9/24.6/15.0/17.0/0.5 | 0.384 | 0.501 | 1.305 | 6 | 120 | Toluene | (3) |
| 15 | TrM/TaM/MM/THFM/t-BAEM | 42.9/24.6/15.0/17.0/0.5 | 0.699 | 0.916 | 1.310 | 6¾ | 120 | do | (2) |
| 16 | TrM/TaM/MM/THFM/HEM | 42.9/24.6/14.5/15.0/3.0 | 1.324 | 1.920 | 1.450 | 5¼ | 95 | Benzene | Bz₂O₂ |
| 17 | TrM/TaM/MM/THFM/HEM | 42.9/24.6/14.5/15.0/3.0 | 0.479 | 0.686 | 1.432 | 8 | 95 | Base Oil #3 | Bz₂O₂ |
| 18 | TrM/TaM/MM/THFM/HEM | 42.9/24.6/15.0/16.0/1.5 | 0.690 | 0.986 | 1.430 | 6 | 95 | do | Bz₂O₂ |
| 19 | TrM/TaM/MM/THFM/HEM | 42.9/24.6/15.0/16.0/1.5 | 0.576 | 0.824 | 1.431 | 8 | 95 | do | Bz₂O₂ |
| 20 | TrM/TaM/MM/THFM/HEM | 42.9/24.6/15.0/16.0/1.5 | 0.960 | 1.452 | 1.513 | 6 | 95 | do | Bz₂O₂ |
| 21 | TrM/TaM/MM/THFM | 48.2/27.6/16.9/7.3 | 0.858 | 1.089 | 1.269 | 6 | 95 | do | Bz₂O₂ |
| 22 | TrM/TaM/MM/THFM | 46.3/26.6/16.2/10.9 | 0.821 | 1.087 | 1.324 | 6 | 95 | do | Bz₂O₂ |
| 23 | TrM/TaM/MM/THFM/HPM | 46.4/26.5/16.3/6.9/3.9 | 1.008 | 1.489 | 1.477 | 6 | 95 | do | Bz₂O₂ |
| 24 | TrM/TaM/MM/THFM/HPM | 46.4/26.5/16.3/6.9/3.9 | 0.870 | 1.255 | 1.443 | 6½ | 95 | do | Bz₂O₂ |
| 25 | TrM/TaM/MM/THFM/HEM | 42.9/24.6/15.0/16.0/1.5 | 0.538 | 0.782 | 1.454 | 6 | 95 | Base Oil #1 | Bz₂O₂ |
| 26 | | | 0.552 | 0.798 | 1.446 | | | | |
| 27 | TrM/TaM/MM/THFM/HPM | 46.4/26.5/16.3/6.9/3.9 | 0.814 | 1.053 | 1.294 | 6½ | 95 | Base Oil #3 | Bz₂O₂ |
| 29 | TrM/TaM/MM/THFM/HPM | 46.4/26.5/16.3/6.9/3.9 | 1.038 | 1.347 | 1.298 | 6 | 95 | do | Bz₂O₂ |
| 31 | TrM/TaM/MM/THFM/HPM | 46.4/26.5/16.3/6.9/3.9 | 1.109 | 1.372 | 1.237 | 6¼ | 95 | do | Bz₂O₂ |
| 32 | | | 1.123 | 1.345 | 1.198 | | | | |
| 33 | TrM/TaM/MM/THFM/HPM | 46.4/26.5/16.3/6.9/3.9 | 1.056 | 1.281 | 1.213 | 6¼ | 95 | do | Bz₂O₂ |
| 34 | | | 1.081 | 1.260 | 1.166 | | | | |
| 35 | TrM/TaM/MM/THFM/HEM | 46.4/26.5/16.3/6.9/3.9 | 0.990 | 1.377 | 1.391 | 7 | 95 | do | Bz₂O₂ |
| 36 | | | 1.011 | 1.370 | 1.355 | | | | |
| 37 | TrM/TaM/MM/THFM/HPM | 43.3/24.8/15.3/13.1/3.6 | 0.688 | 0.978 | 1.422 | 7 | 95 | do | Bz₂O₂ |
| 38 | | | 0.721 | 0.988 | 1.370 | | | | |
| 39 | TrM/TaM/MM/THFM/HPM | 46.4/26.5/16.3/6.9/3.9 | 0.763 | 1.104 | 1.447 | 6 | 95 | do | Bz₂O₂ |
| 40 | | | 0.795 | 1.094 | 1.376 | | | | |
| 41 | TrM/TaM/MM/THFM/HPM | 44.0/25.2/20.0/6.9/3.9 | 0.672 | 0.925 | 1.376 | 6 | 95 | do | Bz₂O₂ |
| 42 | | | 0.688 | 0.916 | 1.341 | | | | |
| 43 | TrM/TaM/MM/THFM/HPM | 45.6/26.1/16.1/10.2/2.0 | 0.672 | 0.949 | 1.412 | 6¾ | 95 | do | Bz₂O₂ |
| 44 | | | 0.708 | 0.958 | 1.353 | | | | |
| 45 | TrM/TaM/MM/THFM | 48.2/27.6/16.9/7.3 | 0.968 | 1.119 | 1.156 | 7 | 95 | do | Bz₂O₂ |
| 46 | TrM/TaM/MM/THFM/VOE | 40.2/18.3/21.0/13.0/7.5 | 0.458 | 0.683 | 1.149 | 7 | 95 | do | Bz₂O₂ |

Key for Table 1

TrM—Tridecyl methacrylate
TaM—Tallow methacrylate
BM—Butyl metacrylate
MM—Methyl methacrylate
V₂P—N-vinyl-2-pyrrolidone
THFM—Tetrahydrofurfuryl metacrylate
VOE—Vinyloxyethanol
t-BEAM—t-Butylaminoethyl methacrylate
HEM—Hydroxyethyl metacrylate
HPM—Hydroxypropyl methacrylate
Bz₂O₂—Benzoyl peroxide
Azo—2,2′-azobis(2-methylpropionitrile) or azobisisobutyronitrile
(1)—Cumene hydroperoxide+t-butyl hydroperoxide+"Hyamin"
(2)—t-Butyl hydroperoxide+"Hyamin"
(3)—Cumene hydroperoxide+"Hyamin"

EXAMPLE 7

This experiment was carried out in a similar manner to Example 1, except as described below. To the dropping funnel was charged 57.5 g. of tridecyl methacrylate, 40.5 g. tallow methacrylate, 7.5 g. methyl methacrylate, 14.5 g. tetrahydrofurfuryl methacrylate, 0.5 g. t-butylaminoethyl methacrylate. The mixture of monomers charged to the dropping funnel totaled about 135 ml., which included 0.07 ml. of t-butyl hydroperoxide catalyst. To the flask was added 4 ml. of "Hyamin" solution. In this run, rather than benzene or toluene as a solvent, base oil No. 1 was used as the solvent for the reaction. During the run in a similar manner as the benzene was added in Example 1, the base oil was added instead from a dropping funnel. Reaction temperature was about 120° C. and reaction time 6 hours and 40 minutes. At the end of 4 hours and 20 minutes of reaction there was added to the reaction flask 0.02 ml. of t-butyl hydroperoxide and 1 ml. of "Hyamin" solution. At the end of 5 hours of reaction to the flask was added 0.05 ml. of t-butyl hydroperoxide and 1 ml. of "Hyamin" solution. At the end of 5 hours and 30 minutes of the run, 1 ml. of "Hyamin" solution was added. At the end of the polymerization run (6⅔ hours total time) 42.4 g. of base oil No. 1 was added to the reaction mixture to give a 37% concentrate. A sample of the 37% concentrate was diluted to 3% using base oil No. 2. Specific viscosity determinations were made of the 3% polymer solution, yielding 0.609 at 100° F. and 0.846 at 210° F. Efficiency was 1.389.

In Table 1 above the first seven experiments are summarized and in addition a large number of other experiments are summarized. These other runs are discussed in some detail subsequent to Table 1.

Example 8 was carried out in a similar manner to Example, except as set forth below. The N-vinyl-2-pyrrolidone monomer was charged to the flask at the beginning of the polymerization run, rather than to the dropping funnel with the rest of the monomers. The entire reaction mixture was solvent-purified in a similar manner as described in Example 5.

Examples 9 and 10 were both carried out in a manner similar to Example 1.

Example 11 was carried out in a similar manner to Example 1, except that a small amount of the reaction mixture was solvent purified to provide a small amount of polymeric product. To the balance of the reaction mixture was added base oil No. 1 and the benzene was stripped out in the usual fashion. Sufficient additional base oil No. 1 was then added to provide a 37% concentrate of the polymer in oil.

Examples 12 and 13 were carried out in a similar manner to Example 11.

Example 14 was carried out in a manner similar to Example 1, however the catalyst was different. The catalyst for this run was cumene hydroperoxide plus "Hyamin." The cumene hydroperoxide was added periodically during the polymerization reaction with the monomers, and the "Hyamin" solution was separately added periodically during the polymerization run.

Example 15 was carried out in a similar manner to Example 1, except that the catalyst was the same catalyst as used in Example 7, namely t-butyl hydroperoxide plus "Hyamin" and the catalyst was added in a similar manner as in Example 7. Contrary to Example 7 wherein base oil was used as the solvent for the reaction, toluene was used as a solvent for the reaction of Example 15. At the end of the polymerization period a small portion of the reaction mixture was removed and solvent purified. To the remainder of the reaction mixture base oil No. 1 was added, toluene was stripped off and additional base oil No. 1 was added to make a 37% concentrate.

Example 16 was carried out in a similar manner to Example 1. At the end of the polymerization run a small amount of reaction product was removed and solvent purified. To the balance of the reaction product was added base oil No. 1 and a 37% concentrate was made in the usual manner; however, the viscosity data found in Table 1 is based on the solvent purified sample.

Example 17 was run in a similar manner to Example 1, except that the solvent for the reaction was base oil No. 3 rather than the volatile solvent such as toluene or benzene. At the end of the run sufficient base oil No. 3 was added to the reaction mixture to give a 37% concentrate. To the 37% concentrate was added a small amount of an antioxidant which was 4,4′-methylene-bis-[2,6-di-tert-butylphenol], and the concentrate was heated at 110° C./95 mm. for 30 minutes to incorporate the antioxidant.

The characteristics of base oil No. 3 are as follows:

Base oil No. 3

The oil is a highly paraffinic refined petroleum lubricating oil having the following properties:

| | |
|---|---|
| Viscosity at 110° F., SUS | 113 |
| Viscosity at 210° F., SUS | 40 |
| Flash point, ° F. | 380 |
| Specific gravity at 60° F. | 0.8639 |

Example 18 was carried out in a similar manner to Example 17 and antioxidant was incorporated in the 37% concentrate in a similar manner as Example 17.

Example 19 was a batch type run wherein all of the monomers were added to the flask at the beginning of the polymerization run rather than periodically during the run from a dropping funnel. Base oil No. 3 was added during the run in small amounts periodically to keep the viscosity down. The antioxidant was incorporated in the concentrate in a similar manner as Example 17. Part of the benzoyl peroxide catalyst was added with the monomers to the flask at the beginning of the run and the balance of the benzoyl peroxide catalyst was added periodically during the run in base oil No. 3.

Examples 20 through 24 were carried out in a similar manner to Example 19, and in each of these examples the antioxidant was incorporated into the 37% concentrate in the usual fashion. To a small sample of the concentrate of Example 23 a nitrogen-containing ashless detergent of the type of "Oronite 1200" was added in minor amount.

Examples 25 and 26 involve a single polymerization run carried out in batch fashion in a similar manner to Example 19. However, the solvent used in the run is base oil No. 1 rather than base oil No. 3. To a portion of the 37% concentrate was added the antioxidant, but to the other portion of the 37% concentrate no antioxidant was added. Example 25 represents the product containing no antioxidant and Example 26 the product containing the antioxidant.

EXAMPLE 27

This example is the first of several examples wherein the time of addition of some of the monomers was varied to see the effect on the properties of the polymer. Except for the tetrahydrofurfuryl methacrylate monomer all of the monomers were charged to the flask at the beginning of the polymerization run. After 1¾ hours of polymerization ½ of the tetrahydrofurfuryl methacrylate monomer was added in base oil No. 3, and after 2½ hours of polymerization the balance of the tetrahydrofurfuryl methacrylate monomer was added in base oil No. 3. At the end of the polymerization run sufficient base oil No. 3 was added to make a 37% concentrate of the polymer. The final concentrate product was divided into two parts and to one part of the concentrate was added an ashless detergent additive (described in Example 23) in minor amount, and this sample with the ashless detergent in it was labeled Example No. 28.

EXAMPLE 29

In this example the hydroxypropyl methacrylate rather than the tetrahydrofurfuryl methacrylate was added late in the polymerization reaction. All of the monomers except the hydroxypropyl methacrylate were charged to the polymerization vessel at the beginning of polymerization. After 1¾ hours of polymerization ½ of the hydroxypropyl methacrylate dissolved in base oil No. 3 was added to the polymerization mixture, and after two hours of polymerization the balance of the hydroxypropyl methacrylate was added to the polymerization mixture. At the end of the polymerization a 37% concentrate was made by adding additional base oil No. 3. Other than the exceptions noted above, Example 29 was conducted in the usual fashion in which the batch-type runs were conducted. The concentrate was divided in two portions and to one portion was added a minor amount of the antioxidant, 4,4'-methylene-bis-[2,6-di-tert-butylphenyl]. The antioxidant was incorporated in the usual fashion and this product with the antioxidant in it was labeled Example No. 30.

EXAMPLE 31

This example was another batch-type run wherein all of the monomers except the tetrahydrofurfuryl methacrylate and methyl methacrylate were charged to the reaction flask at the beginning of the polymerization run. One-half of the tetrahydrofurfuryl methacrylate monomer and ½ of the methyl methacrylate monomer were added to the polymerization mixture in the base oil No. 3 after one hour of polymerization time, and the other half of these two monomers was added to the polymerization mixture after one and three-quarters hours of polymerization time. Other than this Example 31 was carried out in the usual batch fashion. At the end of the polymerization run a 37% concentrate was made of the product by adding base oil No. 3. The concentrate product was divided in two parts and to one part was added a minor amount of ashless detergent (described in Example 23), and the portion containing the ashless detergent was designated Example No. 32.

EXAMPLE 33

This example was a typical polymerization run wherein all of the monomers were charged to the reaction flask at the beginning of the polymerization run with the exception of methyl methacrylate and hydroxypropyl methacrylate. The methyl methacrylate and hydroxypropyl methacrylate monomers were dissolved in base oil No. 3 and ½ of each of these monomers was added to the polymerization reaction at the end of one hour of polymerization and the other ½ at the end of 1¾ hours of polymerization. At the end of the polymerization run the 37% concentrate of the additive was made by adding base oil No. 3. The concentrate was divided into two portions and to one portion was added a minor amount of ashless detergent (described in Example 23), and this portion containing the ashless detergent was labeled Example No. 34.

EXAMPLE 35

In this example all of the monomers were added to the polymerization flask at the beginning of the polymerization run except the tetrahydrofurfuryl methacrylate monomer. At the end of one hour polymerization ½ of the tetrahydrofurfuryl methacrylate monomer was added to the polymerization reaction dissolved in base oil No. 3, and at the end of 1¾ hours the balance of the tetrahydrofurfuryl methacrylate monomer was added to the polymerization mixture. In the usual fashion a 37% concentrate of the polymer was made up. To ½ of this sample of concentrate was added a minor amount of ashless detergent (described in Example 23), and this sample was labeled Example No. 36.

EXAMPLE 37

In this example all of the monomers were added to the polymerization flask at the beginning of the polymerization reaction except the tetrahydrofurfuryl methacrylate monomer. At the end of 1½ hours of polymerization, ½ of the tetrahydrofurfuryl methacrylate monomer dissolved in base oil No. 3 was added to the polymerization reaction, and at the end of 2¼ hours the balance of the tetrahydrofurfuryl methacrylate monomer was added. The usual 37% concentrate was made. To ½ of the concentrate was added a minor amount, 5.7 g. of ashless detergent (described in Example 23) and this was labeled Example No. 38.

EXAMPLE 39

This example was a modified batch-type run in which ½ of all of the monomers plus all of the hydroxypropyl methacrylate monomer was added to the flask at the beginning of the polymerization run, and the other half of the monomers plus all of the tetrahydrofurfuryl methacrylate monomer was added to a dropping funnel. At the end of 1½ hours of polymerization ⅓ of the mixture of monomers was added from the dropping funnel, at the end of two hours of polymerization ⅓ more of the monomers was added and at the end of 2½ hours the balance of the monomers from the dropping funnel was added to the polymerization mixture. At the end of the polymerization run the 37% concentrate was made in the usual fashion and to ½ of the 37% concentrate was added 5.3 g. of ashless detergent (described in Example 23) which was stirred in at 100° C. The sample containing the ashless detergent was labeled Example No. 40.

EXAMPLE 41

In this example all of the monomers were charged to the reaction flask at the beginning of the polymerization run except the tetrahydrofurfuryl methacrylate monomer. At the end of 1¾ hours of polymerization ½ of the tetrahydrofurfuryl methacrylate monomer was added to the polymerization mixture dissolved in base oil No. 3, and at the end of 2½ hours of polymerization the other ½ of the tetrahydrofurfuryl methacrylate monomer was added to the polymerization mixture. The usual 37% concentrate was made in base oil No. 3. To ½ of the concentrate was added 5.0 g. of ashless detergent (described in Example 23) which was stirred in at 100° C., and this was labeled Example No. 42.

EXAMPLE 43

This example was run in a manner similar to Example 39 in that ½ of all monomers except the hydroxypropyl methacrylate monomer and all of the tetrahydrofurfuryl methacrylate monomer was added late in the polymerization run from a dropping funnel. The other half of the monomers, including all of the hydroxypropyl methacrylate monomer and none of the tetrahydrofurfuryl methacrylate monomer was added to the polymerization flask at the beginning of the run. At the end of 1½ hours of polymerization ⅓ of the monomers were added to the reaction mixture from the dropping funnel, at the end of two hours of polymerization ⅓ more of the monomers were added to the polymerization reaction from the dropping funnel and at the end of 2½ hours the balance of the monomers were added from the dropping funnel to the reaction flask. The usual 37% concentrate was made. To ½ of this concentrate was added 5.4 g. of ashless detergent (described in Example 23), and this was labeled Example No. 44.

EXAMPLE 45

This experiment was carried out in a manner similar to Example 21, using the same monomers and ratio of monomers, catalysts and solvent, except that the tetrahydrofurfuryl methacrylate monomer was not added to the flask with the other monomers at the beginning of the run. At the end of 45 minutes of polymerization ⅓ of the tetrahydrofurfuryl methacrylate monomer was added to the flask, another ⅓ at the end of 1½ hours of polymerization and the balance after about 2 hours of polymerization. Also polymerization time was 7 hours instead of 6.

EXAMPLE 46

This example was carried out in a manner similar to Example 45, except a small amount of vinyloxyethanol was mixed with the other monomers in the flask. The tetrahydrofurfuryl monomer was added later during the polymerization in a similar manner to Example 45.

A number of viscosity determinations were made at various temperatures for oil solutions of additives of the invention and for oil solutions of commercial and other polymer additives. The results of these viscosity determinations were compared in two ways by graphical analysis.

Figure 1:
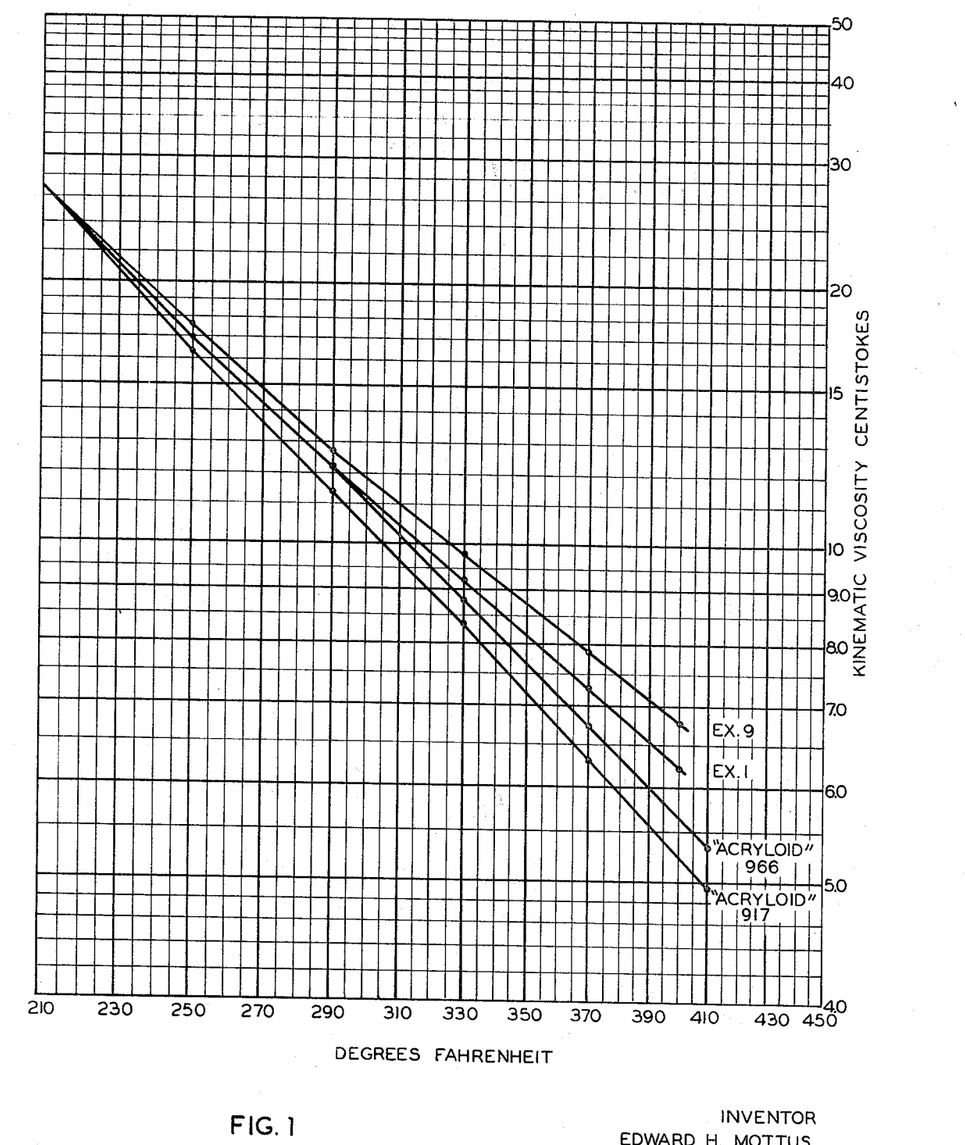
FIGURE 1 is a graph showing curves of viscosity versus temperature for different additives dissolved in oil.
Figure 2:
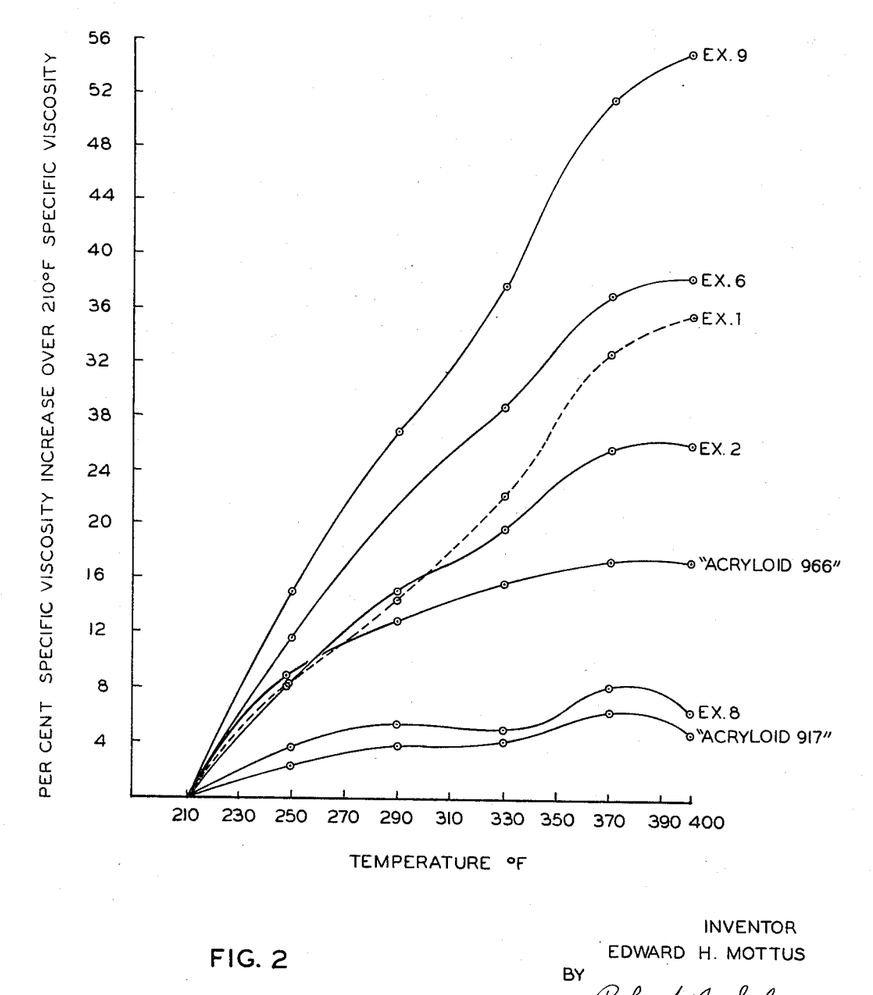
FIGURE 2 is a graph showing curves of percent specific viscosity increase over 210° F. specific viscosity versus temperature for different additives dissolved in oil.

The viscosity determinations for FIGURES 1 and 2 were made on samples of concentrate diluted to 3% polymer with base oil No. 2. The two "Acryloid" additives tested are good viscosity index improvers and low temperature dispersants presently being marketed. Example 8 is a dispersant and viscosity index improver additive which is made from a mixture of alkyl methacrylates and N-vinyl-2-pyrrolidone. Both FIGURES 1 and 2 show the superior high temperature properties of the additives of the invention, and FIGURE 1 also shows the superior low temperature properties of the additives of the invention.

Table 2 which follows reports low temperature detergency tests on the additives of the invention. The testing procedure used was the standard FL-2 as used by industry which test is described as "Research Technique for Determining Effects of Fuels and/or Lubricants or Formation of Engine Deposits." The equipment used is a Chevrolet engine as used in the L-4 test with certain modifications to adapt the equipment to operate at the low temperatures desired for the FL-2 test. The L-4 test and equipment is described in detail in the 1946 edition of the "CRC Handbook" beginning on page 394. The major change in the L-4 equipment for the FL-2 test is the addition of special cooling systems for the jacket and oil pan capable of maintaining the required low temperatures. The coolant temperature is maintained at 85° F.±2° inlet and 95° F.±5° outlet, and the oil sump temperature is maintained at 165° F.±5°. The duration of the test is 40 hours after a 1-hour run-in test. At the end of 10, 20 and 30 hours of test the engine is shut down to measure oil level and add oil if the level is down, and at the end of 10 and 30 hours the engine is shut down for 4 hours and allowed to cool off. After each shutdown period the engine is brought up to speed, load and operating conditions in a 30 minute run-in period. After the test is finished the engine is carefully dismantled taking care not to disturb any deposits. Various parts of the engine are then examined for sludge deposits and comparison is made according to standards and rating described in the "Coordinating Research Council (CRC) Deposit Rating Scale." The first eight engine area ratings in Table 2 are used in determining total rating, i.e. this does not include cylinder block and timing gear cover ratings. Each area is rated on a scale of 1 to 10 with 10 being the highest, indicating the area contains substantially no deposits. In the total rating then the basis is adjusted to the 0–100 scale.

TABLE 2

| Run No | 1 | 2 | 3 | 4 | 5 | 6 | 7 |
| --- | --- | --- | --- | --- | --- | --- | --- |
| Base Oil No | 4 | 4 | 4 | 4 | 4 | 4 | 4 |
| Low Temp. Det.: | | | | | | | |
| Example No | 2 | 3 | 6 | 10 | 15 | 36 | 38 |
| Percent | 0.74 | 0.74 | 0.74 | 0.74 | 0.74 | 0.74 | 0.74 |
| Oxidation: Inhibitor, percent | 0.95 | 0.95 | 0.95 | 0.95 | 0.95 | 0.95 | 0.95 |
| Ratings—Total: | | | | | | | |
| No. 1 Piston | 8.3 | 6.8 | 8.0 | 7.2 | 6.9 | 6.7 | 6.5 |
| Average Piston | 9.0 | 8.4 | 8.6 | 8.6 | 8.1 | 7.8 | 7.9 |
| No. 1 Ring | 10.0 | 10.0 | 9.4 | 10.0 | 9.4 | 10.0 | 10.0 |
| Average Ring | 10.0 | 10.0 | 9.9 | 10.0 | 9.9 | 10.0 | 10.0 |
| Oil Screen | 9.0 | 9.8 | 9.8 | 9.5 | 9.7 | 10.0 | 10.0 |
| Top Deck | 7.5 | 8.6 | 8.4 | 8.4 | 7.8 | 7.8 | 6.8 |
| Push Rod Cover | 6.9 | 7.0 | 6.7 | 6.7 | 6.6 | 7.3 | 7.6 |
| Oil Pan | 7.8 | 8.6 | 6.9 | 6.5 | 6.6 | 7.4 | 8.2 |
| Cylinder Block | 4.2 | 5.2 | 5.1 | 4.3 | 5.0 | 7.4 | 7.0 |
| Timing Gear Cover | 7.0 | 7.3 | 7.0 | 6.0 | 6.8 | 7.8 | 7.5 |
| 8/10 Rating | 85.6/79.7 | 86.5/81.7 | 84.6/79.8 | 83.6/77.2 | 81.3/76.8 | 83.8/81.5 | 83.8/81.5 |

The low temperature detergents of the invention are reported to be present in the oil tested in an amount of 0.74%, and this represents pure polymer not the 37% concentrate, the 37% concentrate having been added to the base oil No. 4 in an amount of 2% in each instance. The oxidation inhibitor was a commercially available additive "Lubrizol 1360" which is a zinc salt of a dialkyl dithiophosphoric acid.

Base oil No. 4

This oil is a solvent refined Mid-Continent petroleum lubricating oil of SAE-30 grade having the following properties:

Viscosity at 210° F., centistokes _______________ 11.68
Viscosity at 100° F., centistokes _______________ 114.7
Viscosity index _______________________________ 97.5

To portions of a number of additive concentrates were added minor amounts of a heavy duty barium detergent comprising sulfurized alkylated phenols reacted with barium and carbonated. Various additives were then added to some of the mixtures of concentrates with barium detergent, and observations were made regarding gellation. The results of these tests were reported in Table 3 following.

TABLE 3

| Ex. No. | Additives | Results |
|---------|-----------|---------|
| Acryloid | (1) | No gel. |
| 8 | (1) | No gel. |
| 6 | (1) | Gel. |
| 4 | (1) | Gel. |
| 18 | (1)+(2) | No gel. |
| 2 | (1) | Gel. |
| 20 | (1) | Gel. |
| 20 | (1)+(3) | Gel. |
| 20 | (1)+(4) | Slowly gelled. |
| 20 | (1) (3)+(4) | No gel. |
| 20 | (1)+(5) | Gel. |
| 20 | (1)+(3)+(5) | Gel. |
| 20 | (1)+(3) | Gel. |
|  | (1)+(3) (gel)+(4) | Gel reverse and become soluble. |
| 20 | (1)+(6) | Gel. |

(1) The barium detergent.
(2) Zinc dialkyldithiophosphate.
(3) Tricresyl posphate.
(4) Octylamine.
(5) N-vinyl-2-pyrrolidone.
(6) Nitrobenzene.

Table 4, which follows, summarizes the effect of varying the time of addition of certain monomers in producing polymer additives of the invention. Additives which are more viscosity stable in the presence of barium heavy duty detergents are produced in certain instances. In each instance, a minor amount of the barium detergent was added to the concentrate of the example.

TABLE 4

Ex. No.:     Results
21 — Gel.
27 — Clear compatible solution.
28 — Clear compatible solution.
29 — Gel in 20–25 sec.
30 — Gel in 20–25 sec.
31 — Hazy without gel.
32 — Clear compatible solution.
33 — Gelled slowly.
34 — Gelled slowly.
45 — Clear compatible solution.

Addition of minor amounts of zinc dialkyldithiophosphate to gels, completely reverted gels to give fluid solutions.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

Having thus described my invention, what I desire to claim and secure by Letters Patent is:

1. A composition having good high temperature and dispersant characteristics comprising a major amount of mineral oil and a minor amount of an oil-soluble interpolymer having viscosity index improving and dispersant characteristics said interpolymer comprising a major amount at least sufficient to give an oil-soluble polymer of at least one oil-solubilizing mono-olefinic monomer and a minor amount at least sufficient to give dispersant characteristics of tetrahydrofurfuryl methacrylate.

2. A composition of claim 1 wherein said oil-solubilizing monomer is an alkyl methacrylate having not less than 6 carbon atoms and not more than 20 carbon atoms in the alkyl group.

3. A composition of claim 1 wherein the polymer has a minor amount insufficient to form an oil-insoluble polymer of $C_1$–$C_4$ alkyl methacrylate.

4. A composition of claim 1 wherein the polymer has a minor amount of vinyloxyethanol.

5. A composition of claim 1 wherein the polymer has a minor amount of N-vinyl-2-pyrrolidone.

6. A composition of claim 1 wherein the polymer has a minor amount of t-butylaminoethyl methacrylate.

7. A composition of claim 1 wherein the polymer has a minor amount of hydroxyethyl methacrylate.

8. A composition of claim 1 wherein the polymer has a minor amount of hydroxypropyl methacrylate.

References Cited by the Examiner

UNITED STATES PATENTS 3,052,648    9/1962    Bauer _____________ 252—56 X
3,067,163    12/1962    Bauer _____________ 260—885

DANIEL E. WYMAN, *Primary Examiner.*

W. H. CANNON, *Assistant Examiner.*